(12) United States Patent
Bendani et al.

(10) Patent No.: US 10,879,809 B2
(45) Date of Patent: Dec. 29, 2020

(54) DC/DC VOLTAGE CONVERTER DEVICE

(71) Applicant: Valeo Siemens eAutomotive France SAS, Cergy (FR)

(72) Inventors: Larbi Bendani, Meru (FR); Luis De Sousa, Woking (GB); Reda Chelghoum, Carrieres-sur-Seine (FR)

(73) Assignee: Valeo Siemens eAutomotive France SAS, Cergy (FR)

(*) Notice: Subject to any disclaimer, the term of this patent is extended or adjusted under 35 U.S.C. 154(b) by 0 days.

(21) Appl. No.: 16/497,731

(22) PCT Filed: Feb. 28, 2018

(86) PCT No.: PCT/EP2018/054976
§ 371 (c)(1),
(2) Date: Sep. 25, 2019

(87) PCT Pub. No.: WO2018/177674
PCT Pub. Date: Oct. 4, 2018

(65) Prior Publication Data
US 2020/0106367 A1  Apr. 2, 2020

(30) Foreign Application Priority Data
Mar. 28, 2017 (FR) ..................... 17 52549

(51) Int. Cl.
*H02M 3/335* (2006.01)
*B60L 53/22* (2019.01)
*B60L 50/64* (2019.01)

(52) U.S. Cl.
CPC ......... *H02M 3/33576* (2013.01); *B60L 50/64* (2019.02); *B60L 53/22* (2019.02); *B60L 2210/10* (2013.01)

(58) Field of Classification Search
CPC ... H02M 3/33576; H02M 3/335; B60L 53/22; B60L 5/64; B60L 2210/10
See application file for complete search history.

(56) References Cited

FOREIGN PATENT DOCUMENTS

| EP | 1020973 A2 | 7/2000 |
|---|---|---|
| FR | 3016096 A1 | 7/2015 |

OTHER PUBLICATIONS

Search Report from French Intellectual Property Office on corresponding FR application (FR1752549) dated Nov. 24, 2017.

(Continued)

*Primary Examiner* — Robert L Deberadinis
(74) *Attorney, Agent, or Firm* — Klein, O'Neill & Singh, LLP (57) ABSTRACT

The invention relates to a DC/DC voltage converter comprising an isolated circuit including inductors coupled to one another by a first magnetic circuit that is independent of a second magnetic circuit coupling inductors to one another, and wherein: —a first side of the electrically isolating barrier includes an electrical branch comprising an inductor that is coupled to the first magnetic circuit and is electrically connected in series with an inductor that is coupled to the second magnetic circuit; and —a second side of the electrically isolating barrier includes a first inductor that is coupled to the first magnetic circuit and a second inductor that is coupled to the second magnetic circuit; the second side of the electrically isolating barrier further comprising a third inductor and a fourth inductor, said third and fourth inductors of the second side being coupled by a respective magnetic circuit to at least one respective inductor that is located on the first side of the isolating barrier.

16 Claims, 6 Drawing Sheets

(56) References Cited

OTHER PUBLICATIONS

International Search Report and Written Opinion on corresponding PCT application (PCT/EP2018/054976) from International Searching Authority (EPO) dated Apr. 9, 2018.
Pinheiro H et al., "Zero Voltage Switching Series Resonant Based UPS," Pesc '98. Record of the 29th Annual IEEE Power Electronics Specialists Conference. Fukuoka, May 18-21, 1998; [Pesc. Annual Power Electronics Specialists Conference], New York, NY : IEEE, US,May 18, 1998 (May 18, 1998), p. 1879-1885, XP001004375, ISBN: 9780780344907.

DC/DC VOLTAGE CONVERTER DEVICE

TECHNICAL FIELD

The present invention relates to a DC/DC voltage converter device, as well as an electrical system including said voltage converter device. In particular, the electrical system is configured to be on board an automobile vehicle. The invention further relates to methods for controlling the electrical system according to the invention.

PRIOR ART

Within the scope of the present application, high voltage is taken to mean a voltage greater than 60V, for example of the order of 100V or several hundreds of volts; low voltage is taken to mean a voltage below 60V, for example of the order of 12V or several tens of volts.

DC/DC (direct current/direct current) converters including an electrical insulation barrier are generally envisaged in automobile applications to adapt voltage levels and to ensure galvanic insulation between a high voltage network and a low voltage network of the vehicle. An isolated DC/DC converter is known from the U.S. Pat. No. 5,754,413. The converter includes two switches forming an arm and which are connected at the level of the mid-point to a branch which includes two transformers in series. The converter is arranged in half-bridge. The switches control the transmission of energy through the transformers to obtain a conversion of an input voltage of the converter into an output voltage. Diodes connected to the secondaries of the transformers make it possible to rectify the output signal. The output voltage is obtained by controlling the duty cycle of the switches. By modifying the duty cycle to reach a target output voltage value, the gain of the converter is adjusted to reach the target output voltage value.

An automobile vehicle may further include an on board charger which enables the recharging of the high voltage battery from an electrical network external to the vehicle. In order to reduce the size of the electronic on board the vehicle and its cost, it is known to integrate the DC/DC converter and the charger in a same packaging. However, the voltage and charge conversion functions remain performed by two different electrical circuits. Yet, pooling the functions of voltage converter and charger would make it possible to further improve the size of the on board electronic.

A solution is thus sought to pool the electrical circuits used during a voltage conversion and/or a charge, notably in an automobile vehicle.

GENERAL DESCRIPTION OF THE INVENTION

In order to resolve this problem, the invention relates to a DC/DC voltage converter device, notably configured to be on board a vehicle, including:
- an isolated circuit which comprises an electrical insulation barrier, and inductors coupled together by a first magnetic circuit independent of a second magnetic circuit which couples the inductors together, and in which:
- a first side of the electrical insulation barrier comprises: at least one electrical branch (A, B) including an inductor which is coupled to the first magnetic circuit and is electrically in series with an inductor coupled to the second magnetic circuit; and switches, designated first side switches, configured to connect said electrical branch between first and second terminals of the device, said switches including switches forming a first arm, and said first and second terminals being configured to be connected to a first electrical network, notably a first electrical network of the vehicle;
- a second side of the electrical insulation barrier comprises: at least one first inductor coupled to the first magnetic circuit and at least one second inductor coupled to the second magnetic circuit, a connection point between the first and the second second side inductors of the insulating barrier forming a third terminal of the device; and switches, designated second side switches, configured to connect the first and second second side inductors between the third and fourth terminals of the device, said third and fourth terminals being configured to be connected to a second electrical network, notably a second electrical network of the vehicle;
- the second side of the electrical insulation barrier further including a third inductor and a fourth inductor, a connection point between the third and the fourth second side inductors of the insulating barrier forming a fifth terminal of the device; and switches configured to connect the third and fourth second side inductors between the fifth and a sixth terminal of the device, said fifth and sixth terminals being configured to be connected to a third electrical network, notably an electrical network external to the vehicle, said third and fourth second side inductors being coupled by a respective magnetic circuit to at least one respective inductor situated on the first side of the insulating barrier and electrically connected with said first side switches.

Compared to the prior art, the DC/DC voltage converter device according to the invention includes the third and the fourth inductors which make it possible to add an isolated input on the device, through which a third electrical network may be connected. Thus, the device according to the invention may carry out a voltage conversion between the first electrical network and the second electrical network thanks to the electrical branch and to the first and second second side inductors. But, moreover, the device according to the invention can carry out a voltage conversion between the first electrical network and the third electrical network thanks to the third and fourth second side inductors and to the first side inductors to which are coupled the third and fourth second side inductors. Thus, the voltage converter device makes it possible to convert a voltage between a first electrical network of the vehicle, notably a high voltage network, connected between its first and its second terminals and a second network of the vehicle, notably a low voltage network, connected between its third and its fourth terminals. Moreover, the voltage converter device makes it possible to convert a voltage between, on the one hand, an electrical network external to the vehicle connected between the fifth and sixth terminals and, on the other hand, the first and/or the second electrical networks.

Notably, said first and second terminals of the device are configured to be connected to the first electrical network via a regulation circuit which is going to adapt the voltage delivered by the first electrical network such that the first side switches operate with a constant duty cycle.

According to an embodiment, the first side of the electrical insulation barrier further includes:
- at least one inductor coupled to the third second side inductor by a third magnetic circuit;

at least one inductor coupled to the fourth second side inductor by a fourth magnetic circuit, said third and fourth magnetic circuits being independent of each other;

said inductor coupled to the third second side inductor and said inductor coupled to the fourth second side inductor being electrically in series, and being electrically connected with said first side switches.

According to an alternative, said inductor coupled to the third second side inductor and said inductor coupled to the fourth second side inductor are situated in said electrical branch.

According to an alternative, said inductor coupled to the third second side inductor and said inductor coupled to the fourth second side inductor are situated in another electrical branch connected in parallel with said electrical branch.

According to an embodiment, the voltage converter device includes a switch, designated neutralisation switch, configured to selectively neutralise said inductor coupled to the third second side inductor and said inductor coupled to the fourth second side inductor.

According to an alternative, said neutralisation switch is configured to selectively short circuit said inductor coupled to the third second side inductor and said inductor coupled to the fourth second side inductor.

According to an alternative, the neutralisation switch is comprised in the electrical branch including said inductor coupled to the third second side inductor and said inductor coupled to the fourth second side inductor, said neutralisation switch being configured to selectively open this branch.

According to an embodiment, the isolated circuit includes on the first side of the electrical insulation barrier:
 a first electrical branch including a first inductor which is coupled to the first magnetic circuit and is electrically in series with a second inductor coupled to the second magnetic circuit;
 a second electrical branch including a third inductor which is coupled to the first magnetic circuit and is electrically in series with a fourth inductor coupled to the second magnetic circuit,
said first side switches being configured to connect said first and second electrical branches between the first and the second terminals of the device, and, the isolated circuit being such that:
 the first side switches comprise a first switch and a second switch forming said first arm with a first capacitor connected between the two switches;
 said second electrical branch is connected between a first extremal terminal of the arm and the connection point, designated second connection point, between the second switch of the arm and the first capacitor, the first extremal terminal of the arm corresponding to the terminal of the first switch which is not connected to the first capacitor; and
 said first electrical branch is connected between a second extremal terminal of the first arm and the connection point, designated first connection point, between the first switch and the first capacitor, the second extremal terminal of the first arm corresponding to the terminal of the second switch which is not connected to the first capacitor.

According to an alternative, the isolated circuit includes on the first side of the electrical insulation barrier:
 a fifth inductor coupled to the third second side inductor by the third magnetic circuit, and a sixth inductor coupled to the fourth second side inductor by the fourth magnetic circuit, said fifth and sixth inductors being electrically in series, and being electrically connected with said first side switches;
 a seventh inductor coupled to the third second side inductor by the third magnetic circuit, and an eighth inductor coupled to the fourth second side inductor by the fourth magnetic circuit, said seventh and eighth inductors being electrically in series, and being electrically connected with said first side switches;
said fifth and sixth inductors being connected to the first electrical branch and said seventh and eighth inductors being connected to the second electrical branch.

According to an alternative, the fifth and sixth inductors are situated in the first electrical branch in series with the first and second inductors; and the seventh and eighth inductors are situated in the second electrical branch in series with the third and fourth inductors.

According to an alternative, the fifth and sixth inductors are situated in an electrical branch parallel to the first electrical branch; and the seventh and eighth inductors are situated in an electrical branch parallel to the second electrical branch.

The invention further relates to an electrical system, notably configured to be on board an automobile vehicle, including:
 a voltage converter device according to the invention;
 a first rechargeable energy source, notably a high voltage battery, connected between the first and the second terminals of said voltage converter device;
 a second rechargeable energy source, notably a low voltage battery, connected between the third and fourth terminals of said voltage converter device.

The invention also relates to a method for controlling an electrical system according to the invention, including the steps consisting in:
 connecting an external electrical energy source to said electrical system between the fifth and sixth terminals of the voltage converter device;
 controlling the first side switches, the second side switches and the switches configured to connect the third and fourth second side inductors between the fifth and the sixth terminals of the device, such that electrical energy circulates between, on the one hand, the external electrical energy source and, on the other hand, the first rechargeable energy source and/or the second rechargeable energy source.

According to an embodiment, said method includes the step consisting in placing said neutralisation switch in a state enabling the operation of said inductor coupled to the third second side inductor and said inductor coupled to the fourth second side inductor.

According to an embodiment, said method includes the steps consisting in:
 placing said neutralisation switch in a state neutralising said inductor coupled to the third second side inductor and said inductor coupled to the fourth second side inductor;
 controlling the first side switches and the second side switches such that electrical energy circulates between the first rechargeable energy source and the second rechargeable energy source, notably from the first rechargeable energy source to the second rechargeable energy source.

BRIEF DESCRIPTION OF THE DRAWINGS

The invention will be better understood by referring to the drawings, in which.

DETAILED DESCRIPTION OF THE INVENTION

Figure 1:
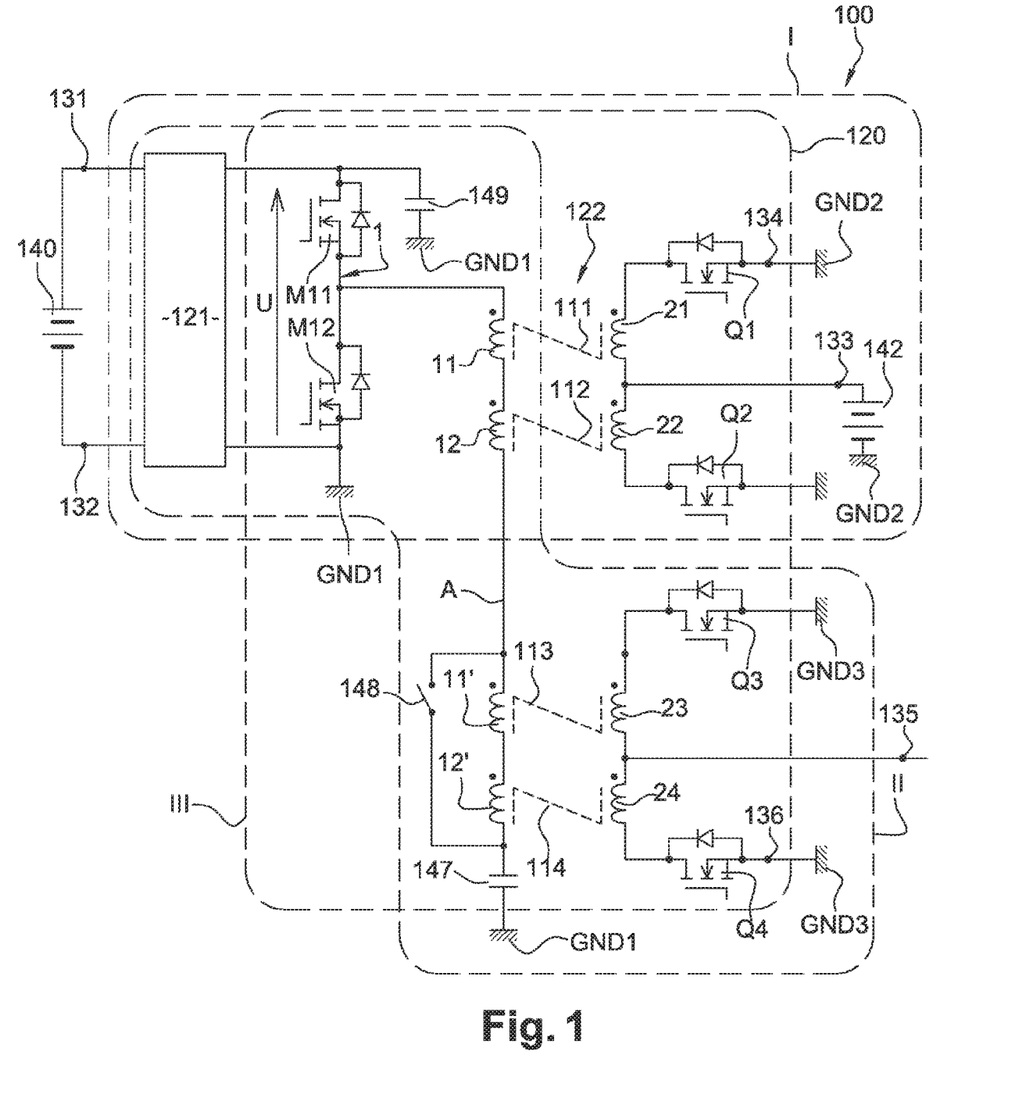
FIG. 1 represents an example of device according to an embodiment of the invention.

FIG. 1 illustrates a first example of DC/DC voltage converter device 100 according to an embodiment.

The DC/DC converter device 100 includes an isolated circuit 120 which comprises an electrical insulation barrier 122. A first magnetic circuit 111 and a second magnetic circuit 112 couple together respective inductors. These two magnetic circuits 111, 112 are independent of each other. Thus, the first magnetic circuit 111 couples together the inductors 11, 21 and the second magnetic circuit 112 couples together other inductors 12, 22.

A first side of the electrical insulation barrier 122 comprises an electrical branch A which includes an inductor 11 coupled to the first magnetic circuit and an inductor 12 coupled to the second magnetic circuit. The inductors 11, 12 are electrically connected in series. In particular, these inductors 11, 12 have a common terminal. The first side of the electrical insulation barrier 122 further comprises switches M11, M12, designated first side switches. These first side switches M11, M12 are configured to connect the electrical branch A between a first terminal 131 and a second terminal 132 of the device, directly, or indirectly through notably a regulation circuit 121 described hereafter. In particular, two first side switches M11, M12 form a first arm 1. Notably, the electrical branch A is connected on the first arm 1 at an intermediate point between the switches M11, M12 of the first arm 1. The electrical branch A may include an electrical capacitor 147 which makes it possible to obtain a zero average current in the isolated circuit 120, notably in the electrical branch A.

A second side of the electrical insulation barrier 122 comprises a first inductor 21 coupled to the first magnetic circuit 111 and a second inductor 22 coupled to the second magnetic circuit 112. The inductors 21, 22 are such that a connection point between the first 21 and the second 22 second side inductors of the insulating barrier 122 forms a third terminal 133 of the device 100. The second side further includes switches Q1, Q2, designated second side switches. These second side switches Q1, Q2 are configured to connect the first second side inductor 21 and the second second side inductor 22 between the third 133 and fourth terminals 134 of the device 100.

The second side of the electrical insulation barrier further includes a third inductor 23 and a fourth inductor 24. The third inductor 23 and the fourth inductor 24 are such that a connection point between the third 23 and the fourth 24 second side inductors of the insulating barrier 122 forms a fifth terminal 135 of the device 100. The second side further includes switches Q3, Q4. These switches Q3, Q4 are configured to connect the third second side inductor 23 and the fourth second side inductor 24 between the fifth 135 and sixth terminals 136 of the device 100. In particular, the third 23 and fourth 24 second side inductors are electrically isolated from the first 21 and second 22 second side inductors.

The third second side inductor 23 is coupled by a magnetic circuit 113 to a first side inductor 11' electrically connected with the first side switches; and the fourth second side inductor 24 is coupled by a magnetic circuit 114 to a first side inductor 12' electrically connected with the first side switches. Thus, an exchange of magnetic energy can take place between the third 23 and fourth 24 inductors on the one hand and the electrical branch A on the other hand.

During the operation of the voltage converter device 100, the first 131 and second 132 terminals of the device 100 may be connected to a first electrical network; the third 133 and fourth 134 terminals may be connected to a second electrical network;

and/or the fifth 135 and sixth 136 terminals may be connected to a third electrical network.

The first 21 and second 22 second side inductors, the third 23 and fourth 24 second side inductors, and the first side inductors 11, 12, 11', 12' exchange, directly or indirectly, magnetic energy together as a function of the open/closed states of the first side switches M11, M12, and the second side switches Q1, Q2, Q3, Q4 during a conversion between two voltages taken between the first 131 and the second 132 terminals or between the third 133 and the fourth 134 terminals, or between the fifth 135 and the sixth 136 terminals.

The first side inductor 11 coupled with the first second side inductor 21, and the first side inductor 12 coupled with the second second side inductor 22 enable an operation in a first DC/DC voltage converter between the first network and the second network as a function of the open/closed states of the first side switches M11, M12 and the second side switches Q1, Q2. During the operation of the first converter I, the third electrical network may be disconnected from the fifth 135 and sixth 136 terminals of the device 100, for example by opening a switch situated between the fifth 135 or the sixth 136 terminals and the third electrical network. Thus, there is no loss of energy by the third 23 and fourth 24 second side inductors.

The first side inductor 11' coupled with the third second side inductor 23, and the first side inductor 12' coupled with the fourth second side inductor 24 enable an operation in a second DC/DC voltage converter II between the first network and the third network as a function of the open/closed states of the first side switches M11, M12 and the switches Q3, Q4 connected to the third 23 and fourth 24 second side inductors. During the operation of the second converter II, the second electrical network may be disconnected from the third 133 and fourth 134 terminals of the device 100, for example by opening a switch situated between the third 133 or the fourth 134 terminals and the second electrical network. Thus, there is no loss of energy by the first 21 and second 22 second side inductors.

Moreover, through, on the one hand, the magnetic coupling between the first side inductors 11, 12, and the first 21 and the second 22 second side inductors and, on the other hand, the magnetic coupling between the first side inductors 11', 12', and the third 23 and the fourth 24 second side inductors, the device 100 enables an operation in a third DC/DC voltage converter III between the second network and the third network. The exchange of energy between the second and the third networks is a function of the open/closed states of the first side switches M11, M12, the switches Q1, Q2 connected to first 21 and second 22 second side inductors, and the switches Q3, Q4 connected to the third 23 and fourth 24 second side inductors. The voltage converter device may thus include three voltage converters. In particular, in one operating mode, the device 100 combines an operation according to the second voltage converter II and the third voltage converter III. The third converter III notably operates at the same time as the second converter II. In particular, the open/closed states of the first side switches M11, M12, the switches Q1, Q2 connected to the first 21 and second 22 second side inductors, and the switches Q3, Q4 connected to the third 23 and fourth 24 second side inductors are determined in such a way as to obtain a given output and/or gain in the exchange of energy between the first and the third networks. The conversion between the first network and the third electrical network is controlled by the switches; the energy exchanged with the second network depends on the voltage on the second electrical network and are not the subject of a particular control.

Notably, in the first voltage converter I, the first side inductor 11 and the first second side inductor 21 coupled by the first magnetic circuit 111, and the first side inductor 12 and the second inductor 22 coupled by the second magnetic circuit 112 form a magnetic component. The first side forms a primary circuit of the magnetic component and the second side forms a secondary circuit of the magnetic component. The first 11 and second 12 first side inductors form respectively a first and a second part of the primary circuit. The first 21 and second 22 second side inductors form respectively a first and a second part of the secondary circuit. The magnetic component is configured, during the conversion of an input voltage of the first converter I into an output voltage, to operate like a transformer from the primary circuit to the secondary circuit and as an impedance which stores energy at the level of the primary circuit.

In particular, the magnetic component operates like a transformer from the primary circuit to the secondary circuit and like an impedance which stores energy at the level of the primary circuit over a same period of operation of the converter. In particular, the first arm 1 is pulse width modulation controlled and, over a same modulation period, the magnetic component operates like a transformer from the primary circuit to the secondary circuit and like an impedance which stores energy at the level of the primary circuit. Thus, over a first part of a period of operation of the first converter I, the first part 11 of the primary circuit transfers energy to the first part 21 of the secondary circuit and the second part 12 of the primary circuit produces an inductor storing energy. Over a second part of the operating period, the second part 12 of the primary circuit transfers energy to the second part 22 of the secondary circuit, and the first part 11 of the primary circuit produces an inductor storing energy. Notably, the first part of the operating period corresponds to a first part of the modulation period; and the second part of the operating period corresponds to a second part of the modulation period. These first and second parts are notably determined by the duty cycle of the first arm 1.

The second voltage converter II has an operation similar to the first voltage converter I with the first side inductor 11' forming the first part of the primary circuit, and the first side inductor 12' forming the second part of the primary circuit. The third second side inductor 23 forms the first part of the secondary circuit, and the fourth second side inductor 24 forms the second part of the secondary circuit. The isolated circuit 120 being reversible, an exchange of energy can take place from the primary to the secondaries; or from the secondaries to the primary.

Notably, the voltage converter device 100 may be on board a vehicle. The first network may be a first electrical network of the vehicle. The second network may be a second electrical network of the vehicle. For example, the first electrical network may have a nominal voltage greater than that of the second electrical network. In particular, the first network may be a high voltage network, which may comprise among others a rechargeable energy source 140, such as a battery of the vehicle, or other high voltage consumers of the vehicle. In particular, the second electrical network may be a low voltage network, which may include among others a rechargeable energy source 142, and other low voltage electricity consumers. The third network may be an electrical network external to the vehicle. For example, the third network may be an electrical network of another vehicle, or a residential electrical distribution network, or a recharge terminal. The electrical networks may include respective earths GND1, GND2, GND3.

Figure 2:
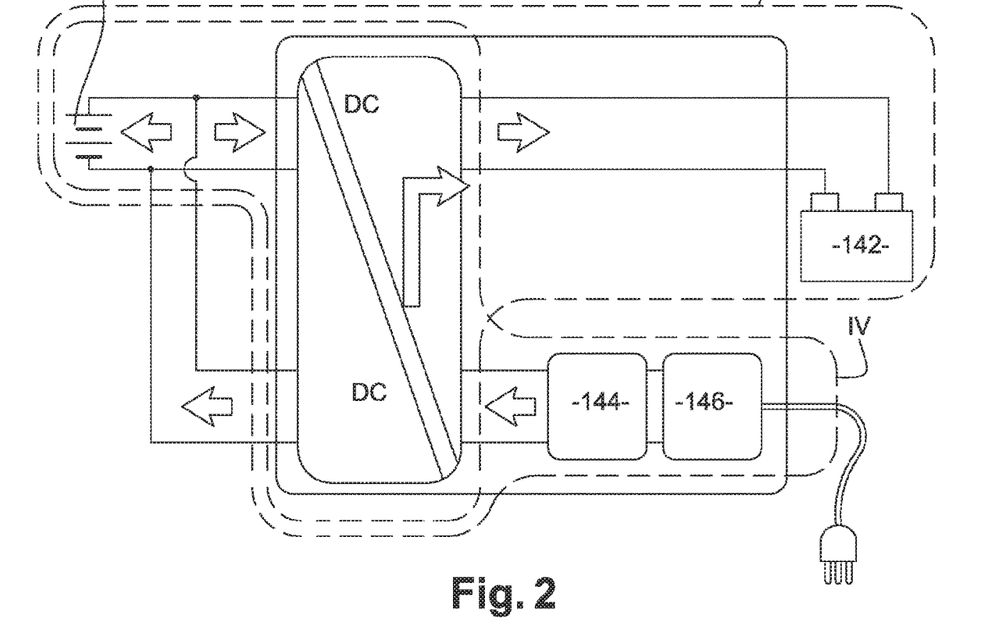
FIG. 2 illustrates examples of operation of the device according to the invention.

Thus, as illustrated for example in FIG. 2, the device 100 makes it possible to produce in a same electrical circuit a first DC/DC converter I between a high voltage network and a low voltage network of the vehicle; and further makes it possible to produce a second DC/DC converter II comprised in an on board charger IV in the vehicle. The second DC/DC converter II may be associated with a PFC (power factor corrector) 144 to place in phase a current and a voltage exchanged with the third electrical network and a rectifier 146 to perform a conversion between an AC voltage of the third electrical network and the DC voltage at the terminals of the second voltage converter II. The PFC 144 and the rectifier 146 may be produced in a same circuit, which connects to the fifth 135 and the sixth terminals 136 of the device 100.

The switches Q1, Q2, Q3, Q4 of the device 100 notably enable a reversible operation of the voltage converter device 100, that is to say an exchange of energy in both directions through the electrical insulation barrier 122. In particular, magnetic energy can circulate between, on the one hand, the first side inductors 11, 12 and, on the other hand, the first 21 and the second second side inductors and/or energy can circulate between, on the one hand, the first side inductors 11', 12' and, on the other hand, the third 23 and the fourth 24 second side inductors.

A first switch Q1 may be connected between a terminal of the first second side inductor 21 and the fourth terminal 134 of the device 100. A second switch Q2 may be connected between a terminal of the second second side inductor 22 and the fourth terminal 134. Notably, the switches Q1, Q2 configured to connect the first 21 and second 22 second side inductors between third 133 and fourth 134 terminals of the device 100 perform an AC/DC conversion between the terminals of the inductors 21, 22 and the third 133 and fourth 134 terminals of the device 100. In particular, the first inductor 21 and the second inductor 22 of the second side of the electrical insulation barrier 122 may have a common electrical terminal forming the third terminal 133 of the device 100, for example as illustrated FIG. 1. However, a switch could be situated between a terminal of the first second side inductor 21 and the third terminal 133 of the device 100; and another switch could be situated between a terminal of the second second side inductor 22 and the third terminal 133 of the device 100.

A third switch Q3 may be connected between a terminal of the third second side inductor 23 and the sixth terminal 136 of the device 100. A fourth switch Q4 may be connected between a terminal of the fourth second side inductor 24 and the sixth terminal 136. Notably, the switches Q3, Q4 configured to connect the third 23 and fourth 24 second side inductors between fifth 135 and sixth 136 terminals of the device 100 perform an AC/DC conversion between the terminals of the inductors 23, 24 and the fifth 135 and sixth 136 terminals of the device 100. In particular, the third inductor 23 and the fourth second side inductor 24 of the electrical insulation barrier 122 may have a common electrical terminal forming the fifth terminal 135 of the device 100, for example as illustrated in FIG. 1. However, a switch could be situated between a terminal of the third second side inductor 23 and the fifth terminal 135 of the device 100; and another switch could be situated between a terminal of the fourth second side inductor 24 and the fifth terminal 135 of the device 100.

In the example illustrated in FIG. 1, the third second side inductor 23 is coupled with an inductor 11' which is different from the first side inductor 11 coupled to the first magnetic circuit 111. The inductor 11' is electrically connected with the first side switches M11, M12; and is coupled to the third second side inductor 23 by a third magnetic circuit 113. The fourth second side inductor 24 is coupled with an inductor 12' which is different from the first side inductor 12 coupled to the second magnetic circuit 112, and which is electrically in series with the inductor 11' coupled to the third second side inductor 23. Notably, a terminal of the first side inductor 12' coupled to the fourth second side inductor 24 is connected to a terminal of the first side inductor 11' coupled to the third magnetic circuit 113. The inductor 12' is electrically connected with the first side switches M11, M12; and is coupled to the fourth second side inductor 24 by a fourth magnetic circuit 114 which is independent of the third magnetic circuit 113.

Thus, the first 21 and second 22 second side inductors, on the one hand, and the third and fourth 24 second side inductors, on the other hand, do not directly exchange electrical energy between each other. Notably, the third 113 and fourth 114 magnetic circuits are independent of the first 111 and second 112 magnetic circuits. Magnetic energy can circulate between the first 21 or second 22 second side inductors, on the one hand, and the third 23 or fourth 24 second side inductors, on the other hand, through a transformation into electrical energy in the first side inductors 11, 12, 11', 12'.

In particular, in a first alternative, the first side inductor 11' coupled to the third second side inductor 23 and the first side inductor 12' coupled to the fourth second side inductor 24 are situated in the electrical branch A, for example as illustrated in FIG. 1. Notably, the first 11, second 12, third 11' and fourth 12' first side inductors may be situated in this order along the first electrical branch A. However, in a second alternative, for example illustrated in FIG. 3, the first side inductor 11' coupled to the third second side inductor 23, and the second side inductor 12' coupled to the fourth second side inductor 24 are situated in a second electrical branch A' connected in parallel with the first electrical branch A. The first alternative enables better control of the energy exchanged with the second electrical network through first 21 and second 22 inductors, because in the second alternative the distribution of current between the first branch A and the second branch A' is subjected and is not controllable.

The device 100 may include a switch 148 configured to selectively neutralise the first side inductor 11' coupled to the third second side inductor 23 and the first side inductor 12' coupled to the fourth inductor 24. Notably, the neutralisation switch 148 can take an open or closed state. The neutralisation switch 148 is configured to, in one of said states, prevent the first side inductor 11' coupled to the third second side inductor 23 and the first side inductor 12' coupled to the fourth inductor 24 participating in the operation of the device 100; and in the other state, to enable said inductors 11', 12' to participate in the operation of the device 100. The neutralisation switch 148 makes it possible to implement only the first converter I between the first and the second networks when this proves to be necessary. For example, when it is wished to produce and exchange energy between the first and the second networks while minimising losses.

In particular, in the first alternative illustrated in FIG. 1, the neutralisation switch 148 may be in parallel with the inductors 11', 12' in series. When the neutralisation switch 148 is closed, it short circuits the inductor 11' coupled to the third second side inductor 23 and the inductor 12' coupled to the fourth second side inductor 24. In the second alternative illustrated in FIG. 3, the neutralisation switch 148 may be in series with the inductors 11', 12'. When the neutralisation switch 148 is open, it disconnects the electrical branch A' containing the inductor 11' coupled to the third second side inductor 23 and the inductor 12' coupled to the fourth second side inductor 24.

Figure 9:
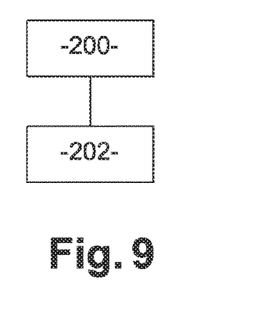
FIGS. 9 and 10 illustrate examples of a method for controlling the device according to the invention.

For example, an electrical energy source external to said device 100 may be connected between the fifth 135 and sixth 136 terminals of the voltage converter device, for example through a rectifier 146 and a PFC 144 as illustrated in FIG. 2. The voltage converter device 100 may then be controlled as illustrated in FIG. 9. In a step 200, the neutralisation switch 148 is placed in a state enabling the operation of the inductor 11' coupled to the third second side inductor 23 and of said inductor 12' coupled to the fourth second side inductor 24. Next, in a step 202, on the one hand the switches M11, M12 of the first side are controlled, on the other hand the switches Q1, Q2 of the second side and/or the switches Q3, Q4 configured to connect the third 23 and fourth second side inductors between the fifth and the sixth terminals of the device, such that electrical energy circulates between, on the one hand, the external electrical energy source and, on the other hand, the first rechargeable energy source 140 and/or the second rechargeable energy source 142. Thus, one or the other of the rechargeable energy sources 140, 142 may be charged at the same time or one at a time.

Figure 10:
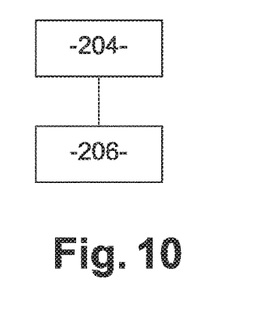

The voltage converter device 100 may be controlled as illustrated in FIG. 10. In a step 204, the neutralisation switch 148 is placed in a state neutralising the inductor 11' coupled to the third second side inductor 23 and the inductor 12' coupled to the fourth second side inductor 24. Thus, the third inductor 23 and the fourth second side inductor 24 do not contribute to the operation of the device 100. Next, in a step 206, the first side switches M11, M12 and the second side switches Q1, Q2 are controlled such that electrical energy circulates between the first rechargeable energy source 140 and the second rechargeable energy source 142. In particular, such that electrical energy circulates from the first rechargeable energy source 140 to the second rechargeable energy source 12. Notably, the device 100 may be in a situation in which no electrical energy circulates in the third 23 and fourth 24 second side inductors. This is for example the case when no electrical energy source is connected between the fifth 135 and the sixth 136 terminals of the device 100.

The transformation ratio N1 from the first first side inductor 11 to the first second side inductor 21 is for example equal to the transformation ratio N2 from the second first side inductor 12 to the second second side inductor 22. However, these two transformation ratios N1, N2 could be of different values. Hereafter, these two transformation ratios are equal to a first value N. The case where the transformation ratios are different may be deduced from this case. The transformation ratio N3 from the first side inductor 11' to the third second side inductor 23 is for example equal to the transformation ratio N4 from the first side inductor 12' to the fourth second side inductor 24. However, these two transformation ratios N3, N4 could be of different values. Hereafter, these two transformation ratios N3, N4 are equal to a second value N'. The case where the transformation ratios are different may be deduced from this case.

The first N and second N' transformation ratio values may be different. The difference between the first N and second N' transformation ratio values makes it possible to adapt the desired powers on the electrical networks, The conversion device 100 may include a regulation circuit 121 connected between the switches M11, M12 of the first arm 1 of the first side and the first 131 and second 132 terminals. The regulation circuit 121 is configured to regulate a parameter U, I at the terminals of the switches M11, M12 of the first arm 1 with a duty cycle of the switches M11, M12 which remains substantially constant. Notably, a capacitor 149 may be connected between a first extremal terminal of the first arm 1 and a second extremal terminal of the first arm 1 so as to maintain a constant voltage at the terminals of the first arm 1.

The regulation circuit 121 is for example configured to regulate a voltage U at the terminals of the switches M11, M12 of the first arm 1, the duty cycle of the first side switches M11, M12 remaining substantially constant. The regulation circuit 121 may then be connected to the extremal terminals of the first arm 1, for example as illustrated in FIG. 1. The regulation circuit 121 may be a boost, step down, boost/step down circuit converter or another type of circuit converter.

Figure 4:
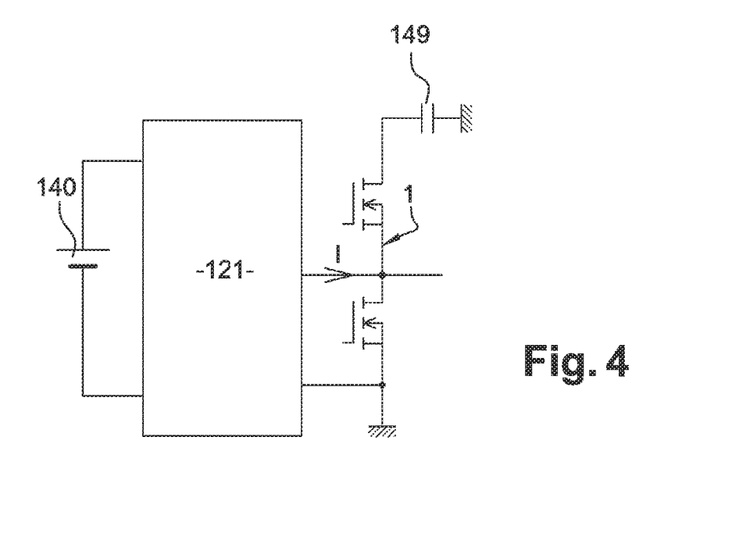
Figure 5:
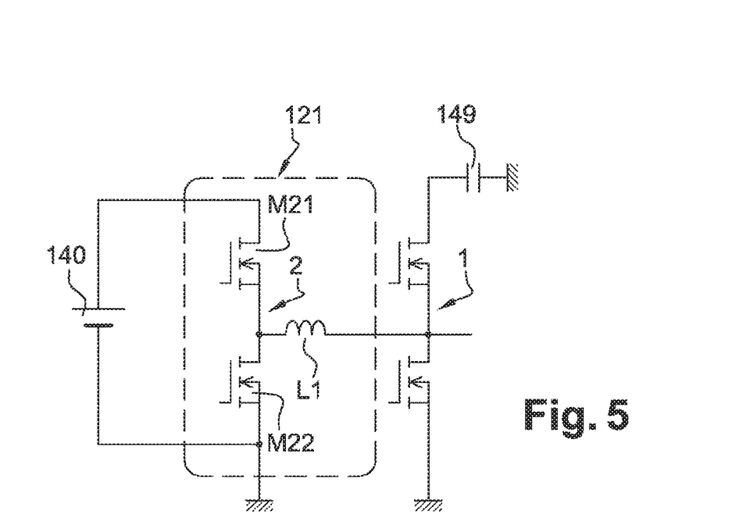

The example illustrated in FIG. 1 could be different, for example as illustrated in FIG. 4 or 5. The regulation circuit 121 may be configured to regulate a current 1 delivered to the first arm 1 of the first side, the duty cycle of the switches M11, M12 of the first arm 1 remaining substantially constant. The regulation circuit 121 may then be connected to the first arm 1 as represented in FIG. 4, that is to say between an extremal terminal of the first arm 1 and the mid-point of the first arm 1. The regulation circuit 121 may be as illustrated in FIG. 5. This regulation circuit 121 includes a second arm 2 connected to the first 131 and to the second 132 terminals. The second arm 2 comprises a first switch M21 and a second electronic element M22. The second electronic element may be a second switch M22 or a diode. An inductor L1 is connected between the mid-points of the first 1 and the second 2 arms.

Figure 3:
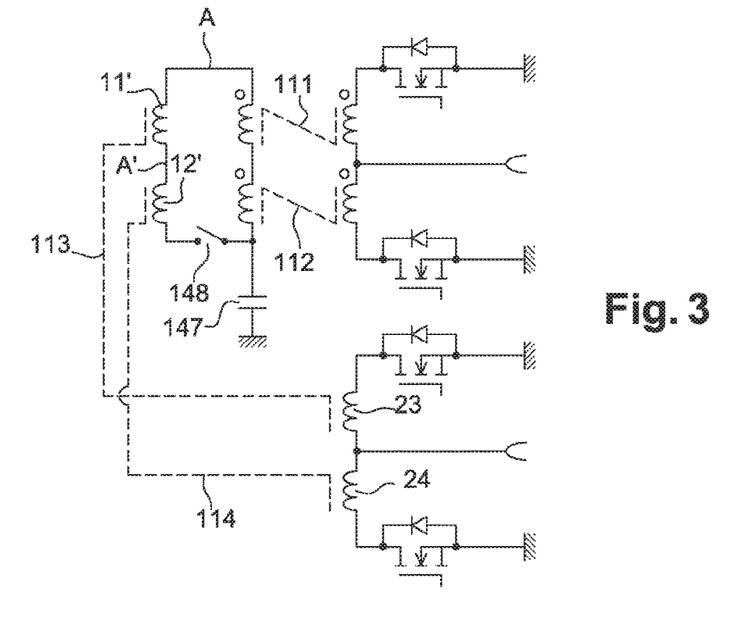
FIGS. 3 to 5 illustrate alternatives of the example illustrated in FIG. 1.
Figure 6:
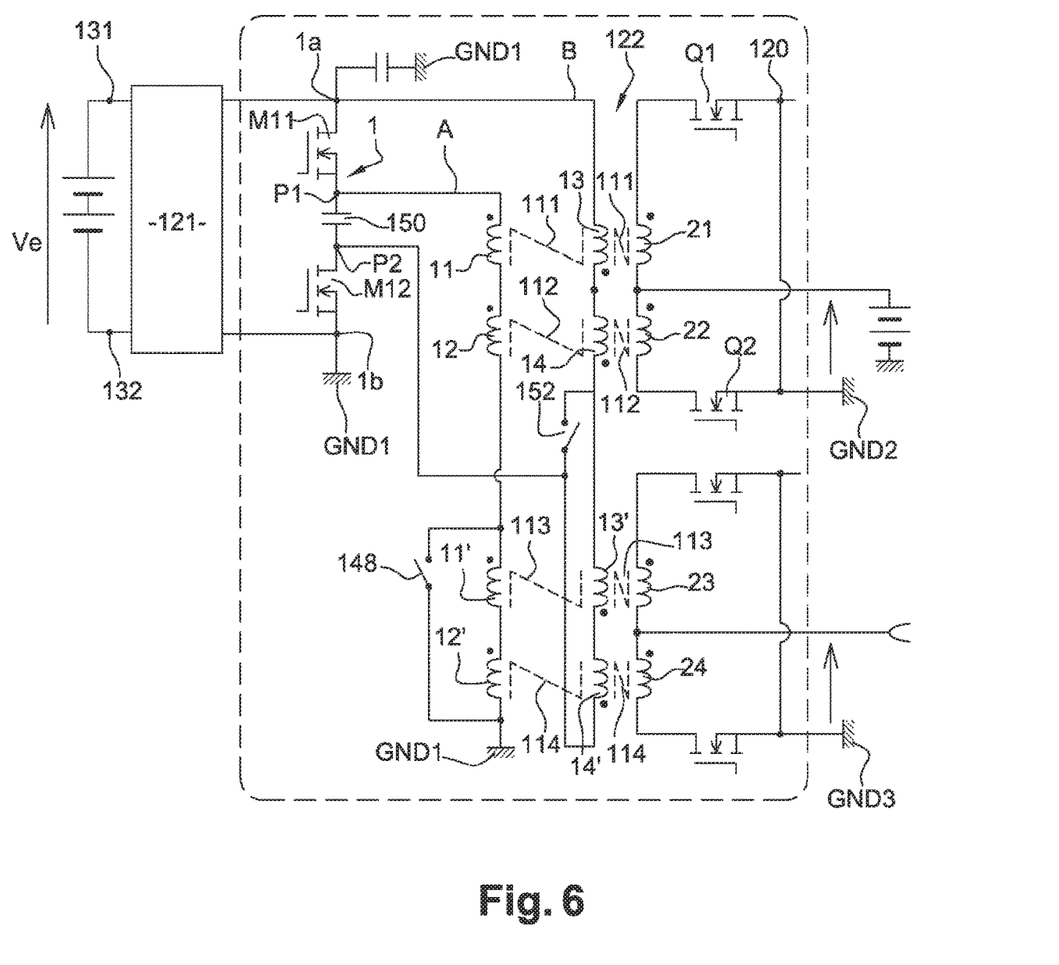
FIG. 6 illustrates an example of device according to an embodiment of the invention.
Figure 7:
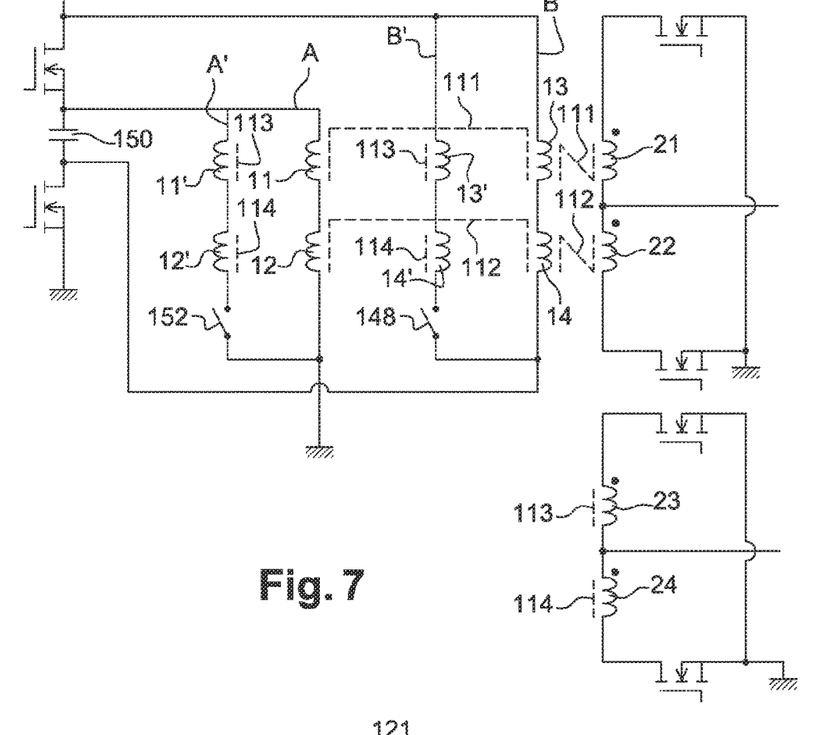
FIGS. 7 and 8 illustrate alternatives of the example illustrated in FIG. 6.

FIGS. 6 and 7 illustrate examples of a device 100 respectively similar to those illustrated in FIG. 1, 3 if it is not for the isolated circuit 120.

In the embodiment illustrated in FIGS. 6 and 7, on the first side of the electrical insulation barrier 122, a second electrical branch B includes a third inductor 13 coupled to the first magnetic circuit 111 and a fourth inductor 14 which is electrically in series with the third inductor 13 and coupled to the second magnetic circuit 112. The first side switches M11, M12 are configured to connect the first A and second B electrical branches between the first 131 and the second 132 terminals of the device 100. A capacitor 150 is situated in the first arm 1 between the two switches M11, M12 of the first arm 1. The capacitor 150 is connected between the two switches M11, M12. Notably, the capacitor 150 may have a first terminal connected to the first switch M11 at the level of a connection point PI, and a second terminal connected to the second switch M12 at the level of a second connection point P2. Notably, the first capacitor 150 may be connected to the first switch M11 at the level of the source electrode of the first switch M11, and it may be connected to the second switch M12 at the level of the drain electrode of the second switch M12. The second electrical branch B is connected between a first extremal terminal of the arm 1 and the second connection point P2. The first extremal terminal of the arm 1 corresponds to the terminal of the first switch M11 which is not connected to the first capacitor 150. The first electrical branch A is connected between a second extremal terminal 1b of the first arm 1 and the first connection point P1. The second extremal terminal 1b of the arm 1 notably corresponds to the terminal of the second switch M12 which is not connected to the first capacitor 150.

In a similar manner to the examples illustrated in FIG. 1, 3, the devices 100 illustrated in FIG. 7, include third 23 and fourth 24 inductors on the second side of the electrical insulation barrier 122. In these alternatives, the device 100 includes additional inductors 11', 12', 13', 14' in a similar manner respectively to the examples illustrated in FIGS. 1 and 3. The isolated circuit 120 includes on the first side of the electrical insulation barrier 122, a fifth inductor 11' coupled to the third second side inductor 23 by a third magnetic circuit 113; and a sixth inductor 12' coupled to the fourth second side inductor by a fourth magnetic circuit 114. The fifth 11' and sixth 12' inductors are electrically in series and are electrically connected with the first side switches M11, M12. The fifth 11' and sixth 12' inductors are connected to the first electrical branch A. The isolated circuit 120 also includes a seventh inductor 13' coupled to the third second side inductor 23 by the third magnetic circuit 113; and an eighth inductor 14' coupled to the fourth second side inductor 24 by the fourth magnetic circuit 114. The seventh 13' and eighth 14' inductors are electrically in series and are electrically connected with the first side switches M11, M12. The seventh 13' and eighth 14' inductors are connected to the second electrical branch B.

In particular, in the example illustrated in FIG. 6, the fifth 11' and sixth 12' inductors are situated in the first electrical branch A in series with the first 11 and second 12 inductors. Notably, the first 11, second 12, fifth 11' and sixth 12' inductors are situated in this order along the first electrical branch A. The seventh 13' and eighth 14' inductors are situated in the second electrical branch B in series with the third 13 and fourth 14 inductors. Notably, the third 13, fourth 14, seventh 13' and eighth 14' inductors are situated in this order along the second electrical branch B.

In particular, in the example illustrated in FIG. 7, the fifth 11' and sixth 12' inductors are situated in an electrical branch A' parallel to the first electrical branch A. The seventh 13' and eighth 14' inductors are situated in an electrical branch B' parallel to the second electrical branch B.

Figure 8:
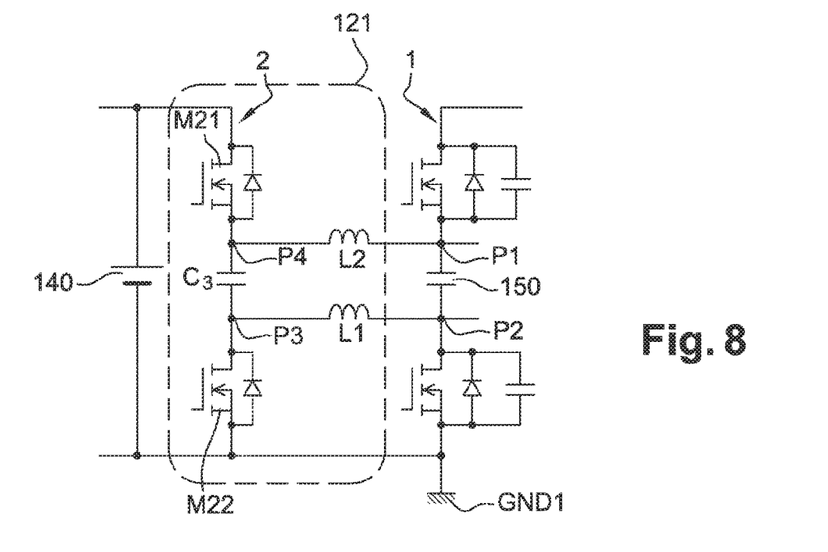

The examples illustrated in FIGS. 6, 7 may include a regulation circuit 121 similar to that described previously. However, the examples 6, 7 may include a regulation circuit 121 which is different from the examples described previously and which is illustrated in FIG. 8. This regulation circuit 121 is similar to that described in FIG. 5, if it is not that it includes a capacitor C3 in the second arm 2 and an inductor L2 connected between the first arm 1 and the second arm 2. The capacitor C3 is connected between the first switch M21 of the second arm 2 and the second switch M22 of the second arm 2. Thus, the capacitor C3 is in series between the first switch M21 and the second switch M22 of the second arm 2. The first inductor L1 of the regulation circuit 121 is connected to the connection point P3 between the capacitor C3 and the second switch M22. The second inductor L2 of the regulation circuit 121 is connected between the first connection point PI of the first arm 1 and a fourth connection point P4 between the first switch M21 and the capacitor C3. By adding the capacitor C3 and the inductor L2, the voltage range that can be reached by the voltage converter device 100 is increased compared to the converter device including the regulation circuit 121 illustrated in FIG. 5. This regulation circuit 121 could dispense with the diodes and capacitors which are in parallel with the switches M21, M22, M11, M12.

In the examples illustrated in FIGS. 6 and 7, the isolated circuit 120 operates in a manner similar to the isolated circuit illustrated in FIGS. 1, 3. In the first voltage converter I, the first 11 and third 13 first side inductors form the first part of the primary circuit and the second 12 and fourth 14 first side inductors form the second part of the primary circuit. The first 21 and second 23 second side inductors form respectively the first and the second parts of the secondary circuit. In the second voltage converter II, the fifth 11' and seventh 13' first side inductors form the first part of the primary circuit and the sixth 12' and eighth 14' first side inductors form the second part of the primary circuit.

Examples of DC/DC voltage converter device 100 according to the invention are particularly suited for on board applications in a vehicle, notably an electric or hybrid vehicle, for the conversion of voltage between a first and a second on board network having different voltages and for the charging of the batteries of the vehicle from an external electrical network. However, the invention is not limited to the examples described and could apply to a residential electrical installation in which the third electrical network is a renewable energy source, such as for example a wind turbine or a photovoltaic panel. Moreover, notably, the switches may be transistors, such as MOSFET, IGBT transistors, or others. The circuits may be produced from a semiconductor material such as silicon (Si), gallium nitride (GaN), silicon carbide (SiC), or any other semiconductor material

The invention claimed is:

1. A DC/DC voltage converter device, notably configured to be on board a vehicle, comprising:
    an isolated circuit which comprises an electrical insulation barrier, and inductors coupled together by a first magnetic circuit independent of a second magnetic circuit which couples the inductors together, and in which:
    a first side of the electrical insulation barrier comprises: at least one electrical branch including an inductor which is coupled to the first magnetic circuit and is electrically in series with an inductor coupled to the second magnetic circuit; and switches, designated first side switches, configured to connect said electrical branch between first and second terminals of the device, said switches including switches forming a first arm, and said first and second terminals being configured to be connected to a first electrical network, notably a first electrical network of the vehicle;
    a second side of the electrical insulation barrier comprises: at least one first inductor coupled to the first magnetic circuit and at least one second inductor coupled to the second magnetic circuit, a connection point between the first and the second second side inductors of the insulating barrier forming a third terminal of the device; and switches, designated second side switches, configured to connect the first and second second side inductors between the third and a fourth terminals of the device, said third and fourth terminals being configured to be connected to a second electrical network, notably a second electrical network of the vehicle;
    the second side of the electrical insulation barrier further including a third inductor and a fourth inductor, a connection point between the third and the fourth second side inductors of the insulating barrier forming a fifth terminal of the device; and switches configured to connect the third and fourth second side inductors between the fifth and a sixth terminal of the device, said fifth and sixth terminals being configured to be connected to a third electrical network, notably an electrical network external to the vehicle,
    said third and fourth second side inductors being coupled by a respective magnetic circuit to at least one respective inductor situated on the first side of the insulating barrier and electrically connected with said first side switches.

2. The voltage converter device according to claim 1, in which the first side of the electrical insulation barrier further includes:
    at least one inductor coupled to the third second side inductor by a third magnetic circuit;
    at least one inductor coupled to the fourth second side inductor by a fourth magnetic circuit, said third and fourth magnetic circuits being independent of each other;
    said inductor coupled to the third second side inductor and said inductor coupled to the fourth second side inductor being electrically in series, and being electrically connected with said first side switches.

3. The voltage converter device according to claim 2, in which said inductor coupled to the third second side inductor and said inductor coupled to the fourth second side inductor are situated in said electrical branch.

4. The voltage converter device according to claim 3, comprising a switch, designated neutralisation switch, configured to selectively neutralise said inductor coupled to the third second side inductor and said inductor coupled to the fourth second side inductor.

5. The voltage converter device according to claim 4, in which said neutralisation switch is configured to selectively short circuit said inductor coupled to the third second side inductor and said inductor coupled to the fourth second side inductor.

6. The voltage converter device according to claim 2, in which said inductor coupled to the third second side inductor and said inductor coupled to the fourth second side inductor are situated in another electrical branch connected in parallel with said electrical branch.

7. The voltage converter device according to claim 6, comprising a switch, designated neutralisation switch, configured to selectively neutralise said inductor coupled to the third second side inductor and said inductor coupled to the fourth second side inductor.

8. The voltage converter device according to claim 7, in which the neutralisation switch is comprised in the electrical branch including said inductor coupled to the third second side inductor and said inductor coupled to the fourth second side inductor, said neutralisation switch being configured to selectively open this branch.

9. The voltage converter device according to claim 1, in which the isolated circuit includes on the first side of the electrical insulation barrier:

a first electrical branch including a first inductor which is coupled to the first magnetic circuit and is electrically in series with a second inductor coupled to the second magnetic circuit;

a second electrical branch including a third inductor which is coupled to the first magnetic circuit and is electrically in series with a fourth inductor coupled to the second magnetic circuit, said first side switches being configured to connect said first and second electrical branches between the first and the second terminals of the device, and the isolated circuit being such that:

the first side switches comprise a first switch and a second switch forming said first arm with a first capacitor connected between the two switches, said second electrical branch is connected between a first extremal terminal of the arm and the connection point, designated second connection point, between the second switch of the arm and the first capacitor, the first extremal terminal of the arm corresponding to the terminal of the first switch which is not connected to the first capacitor; and said first electrical branch is connected between a second extremal terminal of the first arm and the connection point, designated first connection point, between the first switch and the first capacitor, the second extremal terminal of the first arm corresponding to the terminal of the second switch which is not connected to the first capacitor.

10. The voltage converter device according to claim 9, in which the first side of the electrical insulation barrier further includes:

at least one inductor coupled to the third second side inductor by a third magnetic circuit;

at least one inductor coupled to the fourth second side inductor by a fourth magnetic circuit, said third and fourth magnetic circuits being independent of each other;

said inductor coupled to the third second side inductor and said inductor coupled to the fourth second side inductor being electrically in series, and being electrically connected with said first side switches, and in which the isolated circuit includes on the first side of the electrical insulation barrier:

a fifth inductor coupled to the third second side inductor by the third magnetic circuit, and a sixth inductor coupled to the fourth second side inductor by the fourth magnetic circuit, said fifth and sixth inductors being electrically in series, and being electrically connected with said first side switches;

a seventh inductor coupled to the third second side inductor by the third magnetic circuit, and an eighth inductor coupled to the fourth second side inductor by the fourth magnetic circuit, said seventh and eighth inductors being electrically in series, and being electrically connected with said first side switches;

said fifth and sixth inductors being connected to the first electrical branch and said seventh and eighth inductors being connected to the second electrical branch.

11. The voltage converter device according to claim 10, in which said inductor coupled to the third second side inductor and said inductor coupled to the fourth second side inductor are situated in said electrical branch, and in which the fifth and sixth inductors are situated in the first electrical branch in series with the first and second inductors; and the seventh and eighth inductors are situated in the second electrical branch in series with the third and fourth inductors.

12. The voltage converter device according to claim 10, in which said inductor coupled to the third second side inductor and said inductor coupled to the fourth second side inductor are situated in another electrical branch connected in parallel with said electrical branch and in which the fifth and sixth inductors are situated in an electrical branch parallel to the first electrical branch; and the seventh and eighth inductors are situated in an electrical branch parallel to the second electrical branch.

13. An electrical system, notably configured to be on board an automobile vehicle, comprising:

the voltage converter device according to claim 1;

a first rechargeable energy source, notably a high voltage battery, connected between the first and the second terminals of said voltage converter device;

a second rechargeable energy source, notably a low voltage battery, connected between the third and the fourth terminals of said voltage converter device.

14. A method for controlling the electrical system according to claim 13, including the steps consisting in:

connecting an external electrical energy source to said electrical system between the fifth and sixth terminals of the voltage converter device;

controlling the first side switches, the second side switches and the switches configured to connect the third and fourth second side inductors between the fifth and the sixth terminals of the device, such that electrical energy circulates between, on the one hand, the external electrical energy source and, on the other hand, the first rechargeable energy source and/or the second rechargeable energy source.

15. The control method according to claim 14, said method including the step consisting in placing a neutralisation switch configured to selectively neutralise said inductor coupled to the third second side inductor and said inductor coupled to the fourth second side inductor, said neutralisation switch in a state enabling the operation of said inductor coupled to the third second side inductor and said inductor coupled to the fourth second side inductor.

16. The method for controlling the electrical system according to claim 13, said system comprising a neutralisation switch configured to selectively neutralise said inductor coupled to the third second side inductor and said inductor coupled to the fourth second side inductor, the method including the steps consisting in:

placing said neutralisation switch in a state neutralising said inductor coupled to the third second side inductor and said inductor coupled to the fourth second side inductor;

controlling the first side switches and the second side switches such that electrical energy circulates between the first rechargeable energy source and the second rechargeable energy source, notably from the first rechargeable energy source to the second rechargeable energy source.

* * * * *